Feb. 20, 1968 J. R. CROCKFORD 3,369,544
CATAMENIAL TAMPON
Filed March 31, 1965 3 Sheets-Sheet 1

Feb. 20, 1968     J. R. CROCKFORD     3,369,544
CATAMENIAL TAMPON

Filed March 31, 1965     3 Sheets-Sheet 2

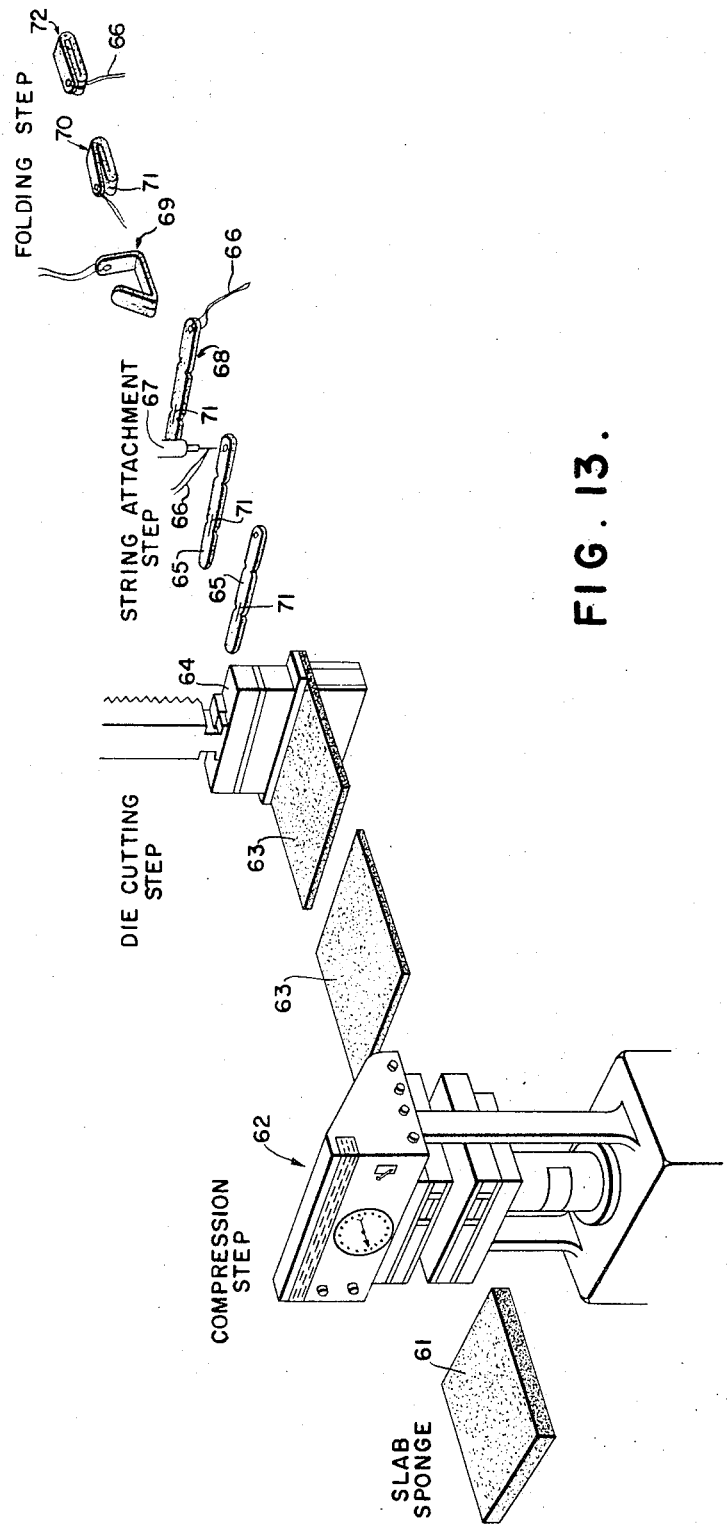

United States Patent Office 3,369,544
Patented Feb. 20, 1968

3,369,544
CATAMENIAL TAMPON
Joseph R. Crockford, Flushing, N.Y., assignor to
Kimberly-Clark Corporation, Neenah, Wis., a
corporation of Delaware
Filed Mar. 31, 1965, Ser. No. 444,258
10 Claims. (Cl. 128—285)

ABSTRACT OF THE DISCLOSURE

A catamenial tampon made of a thin, elongate strip of absorbent material in compressed self-sustaining sheet form transversely folded on itself to a size suitable for insertion into the vaginal cavity. The tampon is held in its folded form by temporary means which may comprise the withdrawal string and a cooperating slot in a juxtaposed fold; a sleeve of water-soluble film; or an applicator tube from which the folded tampon may be ejected.

---

This invention relates generally to absorbent cellulosic products and more particularly to an improved catamenial tampon.

It is an object of the invention to provide a tampon having a spring-like construction which permits the tampon to expand promptly when inserted in the vaginal tract.

Another object is to provide a compressed absorbent tampon which upon contact with fluid expands in a manner to conform more readily to the contours of an enclosing body cavity and thereby more effectively controls leakage from such cavities.

Still another object is to provide a compressed tampon which exhibits an improved capacity to absorb and to hold fluids during use, thus performing its intended function with increased efficiency.

An equally important object is to provide compressed tampons in which the compression of the absorbent material from which the tampon is fabricated, is complete prior to converting the absorbent material into a finished tampon.

Still another object is to provide a high performance tampon at lower cost.

Other objects and advantages of the invention will become apparent by reference to the following specification and accompanying drawings wherein there are illustrated several selected forms of the invention.

It is well known that tampons give the most satisfactory service when they are constructed so that they are small enough for easy insertion, and after insertion will rapidly expand into conforming engagement with the containing body cavity. Merely making a tampon highly absorbent is not sufficient if the tampon does not expand readily and if, when it expands, it does not effectively block the passageway to prevent leakage of fluids along the side walls of the cavity. Thus to be effective, a catamenial tampon must expand rapidly after insertion, and remain expanded, against the restricting forces of the vaginal walls. Also, when expanded the tampon should be in conforming engagement with the vaginal walls. Further, the tampon structure should be sufficiently open to utilize as much as possible of its absorbent capacity to absorb and to hold any fluid which comes in contact with it.

It has been found that the above requirements are substantially met by a tampon which is fabricated from a strip of resilient, expandable, absorbent material folded in one of several spring-like configurations of a size to conveniently fit into the vaginal tract, and temporarily held in such configuration for ease of insertion. The strip material should be of a type which tends to spring back to its unfolded condition when unrestrained, and should also be of a type which retains its compact form when dry and rapidly expands to several times its compact thickness when wetted.

Figure 1:
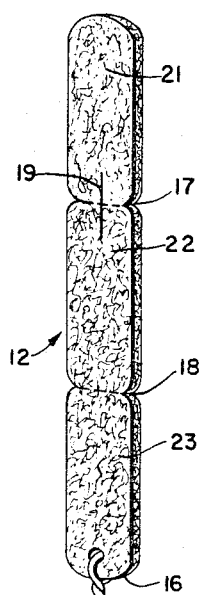
FIG. 1 illustrates a strip of expandable absorbent material from which one embodiment of the tampon of this invention may be made.
Figure 2:
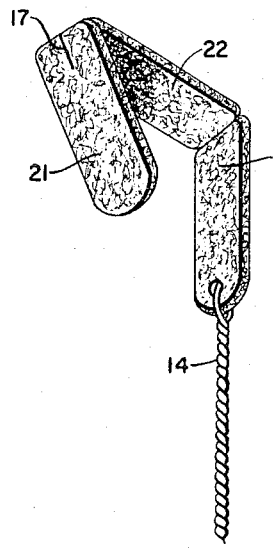
FIGS. 2 and 2a show alternate ways of folding the strip of FIG. 1 to obtain a finished tampon.
Figure 3:
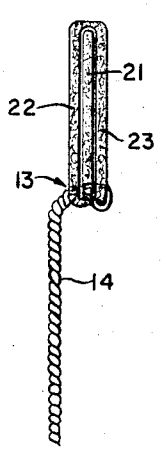
FIGS. 3 and 3a are side views of a finished tampon after folding as shown in FIGS. 2 and 2a respectively.

In one embodiment, as shown in FIGS. 1, 2 and 3, the tampon comprises a narrow die-cut strip 12 of compressed cellulose sponge or the like, from about $\frac{1}{16}$" to $\frac{3}{16}$" thick, from about $\frac{1}{2}$" to $\frac{5}{8}$" wide, and about 6" long. A withdrawal string 14 is affixed to the posterior end 16 thereof. As shown, the strip is rounded off at both ends and has cut-out areas 17 and 18 which divide the strip into three substantially equal portions 21, 22, and 23. The cut-out areas shown in this embodiment provide the finished tampon with rounded ends for aesthetic, as well as comfort reasons, but are not essential. This embodiment also has a short longitudinally extending slot 19 cut through the strip $\frac{1}{3}$ of the distance from the anterior end. This slot cooperates with the withdrawal string, as later explained, to temporarily lock the folded strip in its folded configuration for insertion purposes.

As shown in FIG. 2, in forming the tampon from the strip, anterior portion 21 of the strip 12 is first doubled down over central portion 22. The doubled over strip comprising portions 21 and 22 is then folded down once more over posterior portion 23 to provide the flat, folded configuration shown in FIG. 3. String 14, which is attached to the posterior end of the strip, is drawn firmly through slot 17 in the adjacent overfolded portion of the strip, as shown at 13 in FIG. 3, to temporarily hold the folded tampon in its folded configuration.

Since compressed strip 12 has a natural resilience it will tend to resume the flat configuration shown in FIG. 1 unless some temporary restraining means is provided, such as the cooperating string 14 and slot 17 arrangement. Other suitable restraining means may be used, several of which are described later.

Figure 3B:
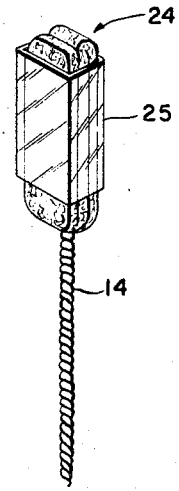
FIG. 3b illustrates one means for temporarily holding the FIG. 3a tampon in its folded configuration for ease in insertion.
Figure 2A:
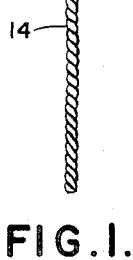
Figure 2A:
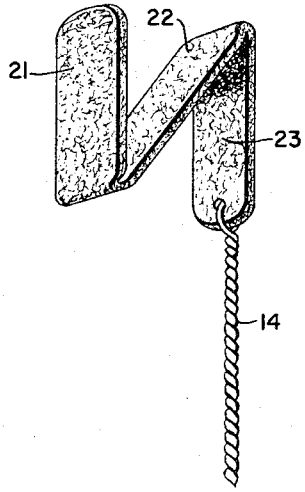
Figure 3A:
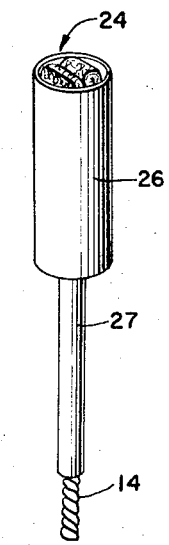

FIGS. 2a and 3a illustrate another way of folding strip 12 to obtain a tampon. In the embodiment shown in these figures, central portion 22 is first folded down over posterior portion 23, and anterior portion 21 is then folded up over central portion 22, providing a flat folded Z configuration as shown in FIG. 3a. The folded tampon 24 is shown held in its folded configuration by an encircling band or sleeve of water-soluble film 25 of polyvinyl alcohol, methyl cellulose, hydroxyethyl cellulose, carboxymethyl cellulose, sodium cellulose sulfate, or the like (FIG. 3b).

Figure 3C:
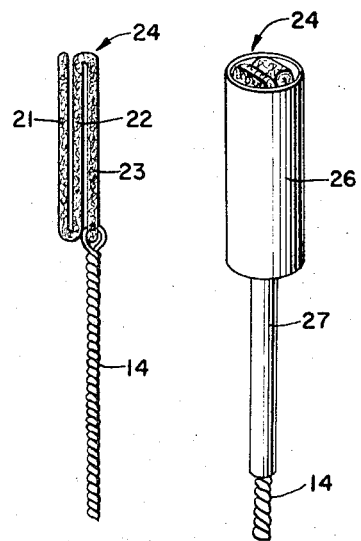
FIG. 3c illustrates an alternate means for temporarily holding the FIG. 3a tampon in folded configuration by the employment of a conventional telescoping tube construction.

Another alternate means for holding the folded tampon 24 in its folded configuration is shown in FIG. 3c where there is employed a conventional telescoping tube construction consisting of outer tube 26 containing the folded tampon, and inner pusher tube 27 through which withdrawal string 14 is threaded.

Figure 4:
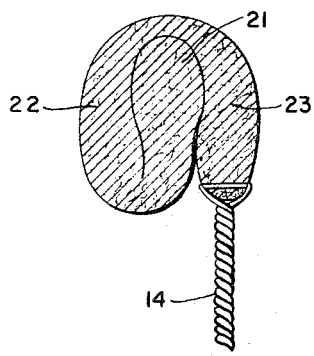
FIG. 4 is a sectional view showing the configuration the tampon of FIG. 3 assumes after it has expanded within the vaginal tract.
Figure 4A:
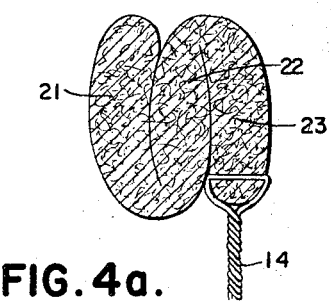
FIG. 4a is a sectional view showing the configuration the tampon of FIG. 3a assumes after it has expanded within the vaginal tract.

When the tampon of FIG. 3 is inserted in the vaginal tract, absorbed fluid will cause it to rapidly expand, softening the ends of the tampon and releasing withdrawal string 14 from its temporary restraining position in slot 19. The expanding forces press outer portions 22 and 23 of the tampon against the vaginal walls, where these expanded portions act as an effective barrier against the downward flow of menstrual fluid. The natural pressure of the vaginal walls, which varies with body movement involved in normal activity, opposes the expansion forces generated by the tampon. Because the folded tampon is quite flexible, the folded portions are capable of movement in various directions at the fold, and in reacting to the natural pressures the tampon will tend to seat itself within the vaginal tract and conform to the configuration of the vaginal walls. In the vagina, the expanded tampon of FIG. 3 assumes substantially the shape shown in the sectional view of FIG. 4, and the expanded tampon of FIG. 3a assumes substantially the shape shown in the sectional view of FIG. 4a.

Figure 5:
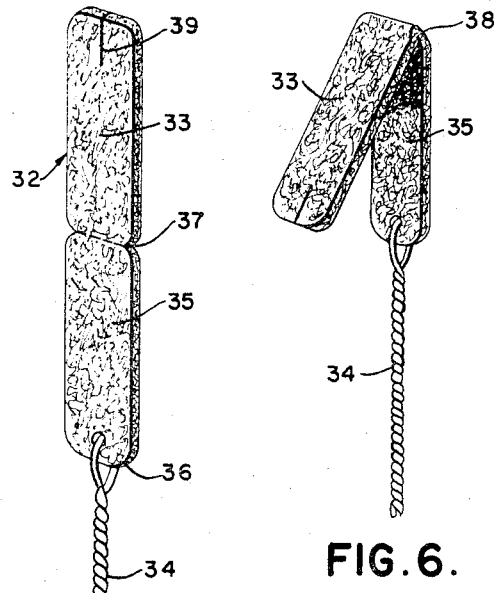
FIG. 5 illustrates another embodiment of a compressed strip from which an alternate embodiment of the tampon may be made.
Figures 6, 7:
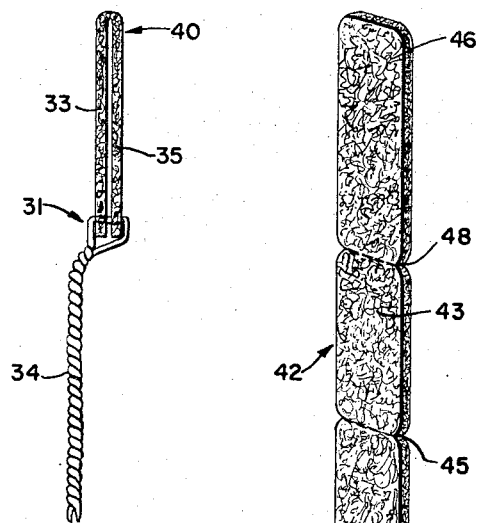
FIG. 6 shows a method of folding the FIG. 5 strip.
FIG. 7 is a side view of the finished tampon formed by folding the FIG. 5 strip in the manner shown in FIG. 6.

The tampon embodied in the illustration of FIGS. 5, 6 and 7 has only a single fold. Resilient strip 32 of compressed material, such as regenerated cellulose sponge or the like, has a withdrawal string attached at its posterior end 36 and has a cut out area 37 at the medial point of the strip. The cut out area 37 provides a rounded top 38 when folded and also marks the point where strip 32 is divided into equal portions 33 and 35. A short slot 39 at the anterior end of strip 32 cooperates with withdrawal string 34 to provide a temporary restraining means when the anterior and posterior portions are folded into juxtaposed position as shown at 31 in the FIG. 7 side view of the finished tampon 40. Tampon 40 has only one fold, in contrast to the multifolds of the other embodiments shown, accordingly the original compressed strip is preferably thicker than the multifolded embodiments, i.e. from 3/16" to 1/4" thick. Since the compressed sponge, when unrestricted, will normally expand to about five times its compressed thickness upon absorbing fluid, a double layer of the indicated thickness will usually provide ample bulk to seal the vaginal tract and prevent leakage. While the single fold of the tampon shown in FIGS. 5, 6 and 7 is within the broad scope of the invention, the preferred tampon structure contains more than one fold.

Figure 9:
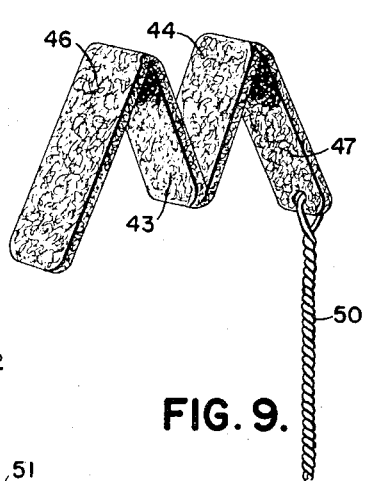
FIG. 9 shows a method of folding the FIG. 8 strip.

Another embodiment of a multifolded tampon in accordance with the invention is shown in FIGS. 8 through 12. In this embodiment, the narrow die-cut strip 42 of compressed material is divided into two smaller central sections 43 and 44 by cut-out portion 45, and into larger anterior and posterior portions 46 and 47 by cut-out portions 48 and 49 respectively. the usual withdrawal string is shown at 50. The strip is folded into the form of an M as shown in FIG. 9 and the finished folded tampon 52 assumes the shape shown in the side view of FIG. 10.

Figures 8, 10:
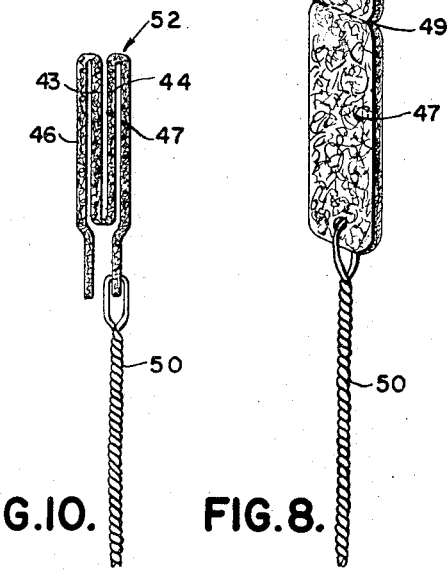
FIG. 8 illustrates still another embodiment of an elongate strip from which a suitable tampon may be formed.
FIG. 10 is a side view of a finished tampon after folding as in FIG. 9.
Figure 10A:
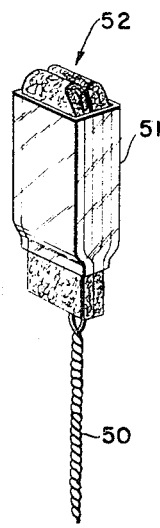
FIG. 10a illustrates a means for holding the tampon of FIG. 10 in its folded configuration prior to use.

FIG. 10a shows the finished tampon 52 of this embodiment held in its folded configuration by a water-soluble film 51. However, other restraining means, such as the telescoping tube previously described, may also be used.

In each of the embodiments, the withdrawal string is shown as being affixed only to the posterior end of the strip. It should be noted that in some instances the string may be affixed to other portions of the folded tampon without detriment to its performance. For example, in the embodiment shown in FIGS. 2a and 3a, the string may alternately be attached along the fold line between anterior portion 21 and central portion 23. In the embodiment shown in FIGS. 9 and 10, the string may alternately be attached either to the anterior portion 46, or along the fold lines between central sections 43 and 44. In any event, the string should be affixed in such a manner that it does not hamper the spring-like opening action of the tampon at the folds.

Figure 11:
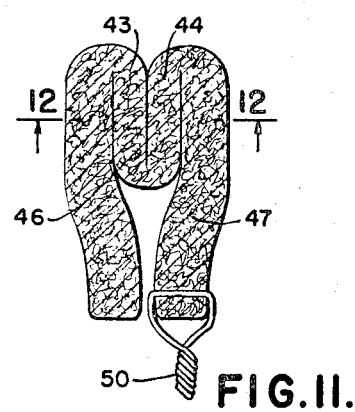
FIG. 11 is a sectional view showing the configuration the tampon of FIG. 10 assumes after it has expanded within the vaginal tract.

In use, the tampon of FIG. 10 expands within the vagina to a configuration somewhat as shown in FIG. 11. A series of in situ X-ray photographs confirmed this.

Figure 12:
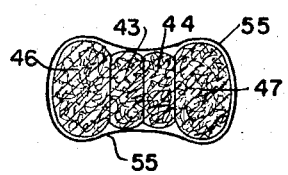
FIG. 12 is a section taken through line 12—12 of FIG. 11, and in addition shows a typical cross-sectional configuration of the vaginal wall and the relationship of the expanded tampon of FIG. 11 with respect to the vaginal wall.

Body pressures in the vaginal tract area are normally highest in a vertical direction. As a result, any expandable material placed in the vaginal tract is less restrained in the horizontal or transverse direction than it is in the vertical direction, thus is more free to expand in the transverse direction. The improved spring-like structure provided by the tampons of this invention permits the tampon to expand more rapidly in a direction at right angles to its fold lines. As a result of the force generated by this spring action, and because there is less restraint in the transverse direction, the tampon, even if improperly placed, tends to work around and seat itself naturally within the transverse configuration of the vaginal tract as shown in the sectional view of FIG. 12, wherein line 55 additionally depicts a typical cross-sectional configuration of the vaginal wall. As shown in FIG. 12 the longer ends 46 and 47 of the tampon readily expand to conform to the larger end sections of the vaginal cross-section while the shorter intermediate portions 43 and 44 do not expand as much because they are restricted by their own folds and the higher vertical pressures within the narrower central area of the vaginal cross-section.

The folded configuration of the tampon acts in several ways to provide more efficient functioning. Since the compressed strip has a natural resilience, the folded strip tends to spring apart in the vaginal tract when the temporary restraining means holding the tampon in its folded configuration is released. Thus, the free ends of the unfolding tampon immediately press against the vaginal walls even before any of the expansion which may result from fluid absorption takes place. The opening up of the tampon by this spring-like action also provides more surface area, whereby fluid absorption is more rapid and better utilization is made of the available absorptive capacity of the tampon. As more fluid is absorbed the tampon expands further and more pressure is exerted by the tampon within the vaginal cavity to fill the cavity more completely thus effectively preventing the bypassing of fluid along the vaginal walls.

As the tampon expands it also becomes much softer and more flexible. This aids in further conforming the tampon to the wall contours to provide tight sealing. Also the increased flexibility permits the folds of the tampon to act somewhat like an articulated joint, whereby the ends and other portions of the tampon tend to move in various directions in cooperation with the movements of the body, providing more comfort as well as more effective sealing action. This soft flexibility also permits easy removal when the tampon is ready for disposal.

It is noted that in the manufacture of compressed tampons prior to this invention, the complete tampon was first fabricated in the size and shape it was intended to have when fully expanded. The fully expanded tampon was then compressed to a much smaller size suitable for insertion into the vaginal tract. In the tampon of this invention, the bulk material is compressed first to thin self-sustaining sheet form, or, a thin sheet of prefabricated self-expanding material is provided; the thin sheet is then cut into narrow strips; and the strips are finally folded into a suitable tampon size and shape. This simple operation reduces manufacturing costs considerably.

Throughout this specification, reference has been made to the use of cellulose sponge or the like as the preferred material. Other materials may be used which have characteristics similar to cellulose sponge, i.e., a suitable material must be resilient and self-sustaining in its compact form when dry; it must be of a type which when folded tends to spring back to unfolded form when unrestrained; it must have high absorptive capacity for fluids; and it must have the ability to readily expand within restricting body cavities to several times its compact thickness as fluids are absorbed therein. Sponges other than cellulose or generated cellulose may be used, including natural sponges and synthetic sponges such as vinyl sponges made from vinyl alcohol, vinyl chloride and copolymers, etc. One example of the latter is a polyvinyl formal sponge in which from 35% to 80% of the hydroxyl groups of the alcohol have been reacted. A sponge of this type is disclosed in U.S. Patent No. 2,659,935.

In addition to absorbent sponge material, various combinations of absorbent and non-absorbent synthetic fibers and absorbent natural fibers may be used. Such combinations are described in U.S. Patent No. 2,761,449, which patent has the same assignee as this invention. In general, absorbent materials containing from 3% to 20% non-absorbent resilient fibers are satisfactory. In accordance with an example described in the latter patent a suitable combination for use as the compressed strip in this invention may comprise about 3 to 20 percent by weight non-absorbent, synthetic, resilient fibers having lengths in the range of about ¾" to about 2½" and a denier within the range of about 3 to 20, the remainder of the body comprising absorbent fibers such as cotton linters, or bleached absorbent wood pulp fibers sometimes known as fluff, or both of said materials, the length of which fibers are generally less than 3/16".

Also as noted previously, the starting uncompressed material may be of a thickness of from ⅜" to about ¾". The self-sustaining compressed sheet may be from 1/16" to about ¼" thick. The ratio of expansion being in the range of from about 3 to 1 to about 6 to 1.

While compressed sheets generally employed have a flat unembossed configuration, it will readily be seen that various embossings may also be employed.

The principles of the invention may be practiced with materials other than those specifically named herein, the important thing being that they meet the above-defined characteristics of resilience and stability when dry, expansion when wet, and high fluid absorption.

Tampons made according to this invention may be employed without an applicator, or be associated with any suitable type of applicator or inserter.

The tampons as above described are merely illustrative embodiments of the invention. Various modifications and changes may be made while still remaining within the spirit of the invention.

What is claimed is:

1. A catamenial tampon comprising a thin elongate strip of absorbent material in compressed self-sustaining sheet form, said compressed strip retaining its compressed condition when dry while being self-expanding when wetted, said strip being transversely folded on itself to a size suitable for insertion into the vaginal cavity, and temporary restraining means holding said folded strip in folded configuration, said restraining means comprising a withdrawal string affixed to one end of said folded strip and a longitudinal slot cut through a juxtaposed portion of said folded strip to receive said string, said string being drawn through said slot and in frictional engagement therewith.

2. The tampon of claim 1 in which the absorbent material comprises porous sponge.

3. The tampon of claim 1 in which the absorbent material comprises 3 to 20 percent by weight of non-absorbent, synthetic, resilient fibers having lengths in the range of about 3 to 20, and a major portion of the remainder comprising absorbent fibers having lengths generally less than 3/16".

4. A catamenial tampon comprising a thin elongate strip of highly compressed fluid absorbent material, said strip in compressed form being self-sustaining when dry and capable of very rapid self-expansion when wetted, said strip having an anterior portion, a central portion and a posterior portion, and a withdrawal string affixed to said posterior portion, said strip being transversely oxerfolded on itself to a size suitable for insertion into the vaginal cavity, said folds being on lines spaced approximately one-third of the distance from each end of said strip, the anterior portion of said folded strip being positioned between said central portion and said posterior portion, the fold between said central portion and said anterior portion having a slot therethrough, and said string being drawn through said slot in frictional engagement therewith holding said strip in its folded configuration.

5. A catamenial tampon comprising a thin elongate strip of highly compressed fluid absorbent material, said strip in compressed form being self-sustaining when dry and capable of very rapid self-expansion when wetted, said strip being transversely folded to a size suitable for insertion into the vaginal cavity, said folds being on lines spaced approximately one-third of the distance from each end of said strip and defining an anterior portion, a central portion and a posterior portion, said folds being in a Z-configuration whereby the anterior and posterior portions form the ends of said Z, a withdrawal string attached at one end of said folded strip, and temporary restraining means holding said folded strip in folded configuration.

6. The tampon of claim 5 in which the temporary restraining means is a water-soluble film.

7. The tampon of claim 5 in which the temporary restraining means is an applicator tube which surrounds the folded strip and from which said strip may be ejected while in folded form.

8. A catamenial tampon comprising a thin elongate strip of highly compressed fluid absorbent material, said strip in compressed form being self-sustaining when dry and capable of very rapid self-expansion when wetted, said strip being transversely multifolded upon itself in the form of an M configuration to a size suitable for insertion in the vaginal cavity, a withdrawal string being affixed to the end of one of the legs of said M, and temporary restraining means holding said folded strip in folded configuration.

9. The tampon of claim 8 wherein the temporary restraining means is a water-soluble film.

10. The tampon of claim 8 wherein the temporary restraining means is an applicator tube which surrounds the folded strip and from which said strip may be ejected while in folded form.

References Cited

UNITED STATES PATENTS

| 2,092,427 | 9/1937 | Ross | 128—263 |
| 2,440,141 | 4/1948 | Donovan | 128—285 |
| 2,458,685 | 1/1949 | Crockford | 128—263 |
| 2,711,173 | 6/1955 | Seidler | 128—263 |
| 2,761,449 | 9/1956 | Bletzinger | 128—285 |
| 2,808,832 | 10/1957 | Myers et al. | 128—285 |
| 3,051,177 | 8/1962 | Wilson | 128—285 |
| 3,079,921 | 3/1963 | Brecht et al. | 128—285 |

FOREIGN PATENTS 532,745   1/1941   Great Britain.

RICHARD A. GAUDET, *Primary Examiner.*

CHARLES F. ROSENBAUM, *Examiner.*